United States Patent Office 3,579,585
Patented May 18, 1971

3,579,585
PREPARATION OF AMINES
Horst Rutzen, Dusseldorf-Holthausen, Germany, assignor to Henkel & Cie., G.m.b.H., Dusseldorf-Holthausen, Germany
No Drawing. Filed Dec. 9, 1968, Ser. No. 782,480
Claims priority, application Germany, Dec. 8, 1967, H 64,713
Int. Cl. C07c 85/00, 85/02, 85/12
U.S. Cl. 260—583                                11 Claims

ABSTRACT OF THE DISCLOSURE

A process for the preparation of aliphatic amines of the formula

wherein R is selected from the group consisting of saturated and unsaturated aliphatic radicals of 6 to 22 carbon carbon atoms and $R_1$ and $R_2$ are selected from the group consisting of hydrogen and alkyl of 1 to 4 carbon atoms which comprises reacting a fatty acid glyceride having an R radical with a nitrogen compound of the formula

wherein $R_1$ and $R_2$ have the above definitions at 200 to 400° C. and a hydrogen pressure of 50 to 400 atmospheres in the presence of a metal oxide catalyst in lump form selected from the group consisting of zinc oxide-aluminum oxide and zinc oxide-chromium oxide catalysts.

PRIOR ART

An important raw material source for the preparation of amines having a long chain aliphatic radical is natural oils and fats. The known preparation of amines from these materials required several steps beginning with splitting of the fat to form the fatty acids, converting the fatty acids into derivatives which can be aminated or reduced to the amine and then aminating or reducing the derivatives to the desired amine. No direct preparation of amines from fatty acid glycerides has been known.

OBJECTS OF THE INVENTION

It is an object of the invention to provide a novel process for the preparation of amines directly from fatty acid glycerides.

It is another object of the invention to produce aliphatic amines by hydrogenating a fatty acid glyceride and ammonia or an amine in the presence of an oxide catalyst.

These and other objects and advantages of the invention will become obvious from the following detailed description.

THE INVENTION

The process of the invention for the preparation of aliphatic amines of the formula

wherein R is a saturated or unsaturated aliphatic radical of 6 to 22 carbon atoms and $R_1$ and $R_2$ are selected from the group consisting of hydrogen and alkyl of 1 to 4 carbon atoms comprises reacting a fatty acid glyceride having an R radical with a compound of the formula

wherein $R_1$ and $R_2$ have the above definitions at 200 to 400° C., preferably 200 to 350° C., and a hydrogen pressure of 50 to 400, preferably 100 to 300, atmospheres in the presence of metal oxide catalyst in lump form. The weight ratio of glyceride to nitrogen compound may be 1:0.1 to 1:1, preferably 1:0.3 to 1:0.8.

The metal oxide catalyst is preferably a mixed metal oxide containing zinc oxide. Examples of other metals than zinc oxide are oxides of aluminum, chromium, titanium, vanadium, molybdenum, tungsten or mixtures thereof. Additionally, small amounts of other metal oxide may be present such as barium, tin or cadmium. The preferred catalysts are zinc-aluminum oxide or zinc-chromium oxide.

The catalysts may be prepared by mixing the metal oxides, hydroxides or carbonates concerned in a paste-like or suspended form followed by drying in known way. The catalyst is used in lump form. The dried catalyst mixture may either be broken into fragments or made into tablets after grinding, if desired with addition of binders and/or graphite.

The catalyst is subjected, if desired, to a careful reduction before use. This is necessary when oxides of transition metals in their highest stage of valency are used for the preparation of the catalyst, for example when chromium sesquioxide is used, which in the after-treatment is reduced to the trivalent stage. The catalysts may also be subjected to a high temperature treatment in the presence of nitrogen or reducing gases and/or vapours at 500–1000° C. in order to increase their activity.

All complete and/or part esters of glycerine with straight or branched chain, saturated or unsaturated carboxylic acids with 6 to 22 carbon atoms may be used as starting substances. Among these, the natural fats and oils, which may be of vegetable or animal origin, are of special importance. Examples of these include coconut oil, palm kernel oil, cottonseed oil, groundnut oil, linseed oil, palm oil, rape oil, soya bean oil, tallow, neat's foot oil or whale oil. The natural fats may be used after the usual pretreatment steps such as treatment with bleaching earths, partial or complete hardening, and also without any pretreatment. The C=C double bonds of unsaturated fats and oils mostly remain during the process of the invention.

The lower aliphatic amines to be used according to the invention are the mono- and di-alkyl amines having 1 to 4 carbon atoms in the alkyl residue, such as mono- and dimethylamine, mono- and di-ethylamine, primary and secondary propylamines and butylamines.

If desired, the alkylamines may be produced in situ from their initial starting alkanol and ammonia, such as methanol and ammonia instead of the methylamines. The alcohol in this case serves at the same time as a solvent or diluent for the fatty acid glyceride to be fed in.

Ammonia and its mono- and di-methyl substitution products are used with particular advantage as the amine components. The fatty acid glycerides are suitably fed into the reaction apparatus jointly with ammonia or lower amines or the substances from which they are formed in situ.

The relative proportions of the reactants are adjusted so that 100 to 1000 g., preferably 300 to 800 g., of the respective amine components, in fresh or recovered state, are used per kilogram of fatty acid glyceride. It is advantageous to preheat the reactants to 50–350° C. before feeding them into the reaction apparatus. The reaction may be carried out in the usual continuously operating pressure hydrogenation apparatus with recycling of gas.

Commercially pure hydrogen may be used for the reduction. It is suitably used in an excess amounting to 50 to 500 times the amount theoretically required. A part of the hydrogen may be replaced by any gases which are inert under the reaction conditions. The hydrogen or the hydrogen-inert gas mixture is preferably recycled. The amount of gas, under pressure, recycled is preferably 300–400 pressure liters per hour.

The products of the process may be used as flotation assistants, road building assistants, agents for protecting against corrosion and for the synthesis of surface-active products.

The particular advantage attainable with the invention is that natural fats and oils can be used as starting materials. Therefore, several of the stages of the prior art process, in some cases very expensive for the preparation of the fatty amine are eliminated. The process of the invention also allows the preparation of specific N-alkyl fatty amines from this relatively cheap raw material in a one-stage and continuous process, and therefore opens a way for the large-scale production of these compounds.

In the following examples there are described several preferred embodiments to illustrate the invention. However, it should be understood that the invention is not intended to be limited to the specific embodiments.

PREPARATION A

Zinc oxide-aluminum oxide catalyst 50 kg. of technical pulverulent zinc oxide and 50 kg. of aluminum hydroxide (crystalline form, bulk density 1275 g. per liter) were mixed with water in a kneader to form a stiff paste. The paste was dried at 80° C. and the solid cake formed was finely ground. After addition of 3% by weight of graphite, the powder was press-moulded into 4 mm. tablets.

PREPARATION B

Zinc oxide-chromium oxide catalyst 81.4 kg. of technical pulverulent zinc oxide and 60 kg. of chromium sesquioxide were mixed in a kneader with water to form a stiff paste. The paste was dried at 80° C. and the solid cake formed was finely ground. The powder was mixed with 3% by weight of graphite and press-moulded into 6 mm. tablets.

EXAMPLE I 12 liters of the zinc oxide-aluminum oxide catalyst of preparation A were placed in a known hydrogenation apparatus consisting of a heated 14 liter pressure oven, a gas circulating system, a condenser and a pressure separator for separating hydrogen and for depressurizing the reaction product. The tablets were heated to 310° C. in a hydrogen stream (250 atmospheres, 385 liters under pressure per hour). After this temperature was reached, 1 liter of coconut oil which had been pretreated with fuller's earth (acid value 15.4, saponification value 259, iodine value 8.6) and 600 g. of commercial ammonia preheated together to 310° C., were fed hourly into the oven. About 1.0 liter of reaction product was removed hourly from the pressure separator. The reaction product was decanted from the water and freed from dissolved volatile substance by heating in a water-jet vacuum until boiling began. The amine number (AZ) of the crude product thus obtained was 269. A 500 g. sample of the crude product was distilled over an 80 cm. saddle-shaped column and gave 81% of distillable substance. The amine number of the distillate was 297. The NMR-spectrographic examination showed a content of 93% of primary coconut amine and 7% of secondary amines of different composition.

The amine number of the crude product was determined as the amount of potassium hydroxide in mg. which corresponds to the amount of hydrochloric acid consumed during the formation of the hydrochloride of 1 g. of amine. In order to determine the yield, an aliquot part of the crude product was distilled and the distillation residue was weighed and an amine number determination and NMR spectrographic examination were carried out with the distillable fraction.

EXAMPLE II

Example I was repeated except that instead of the ammonia, 600 g. of commercial methylamine (97%) were fed in per hour and about 1.2 liters of reaction product were removed hourly. The crude product, worked up as in Example I, had an amine number of 280 and gave on distillation a 92% distillable fraction with an amine number of 284. The NMR spectrographic examination of the distillate showed a content of 95% of N-methyl-coconut amine and 5% of N,N-dimethyl-coconut amine.

EXAMPLE III

Example I was repeated except that instead of the ammonia, 600 g. of commercial dimethylamine (97%) were fed in per hour and about 1.2 liters of reaction product were removed per hour. The crude product, worked up as in Example I, had an amine number of 218 and gave 89% of distillable product with an amine number of 238 on distillation. The NMR spectrographic examination showed a content of 66% of N-methyl-coconut amine and 34% of N,N-dimethyl-coconut amine.

EXAMPLE IV

Example I was repeated except that the quantity of coconut oil fed in per hour was mixed with 0.5 liter of methanol and about 1.3 liter of reaction product were obtained per hour. The crude product, worked up according to Example I, had an amine number of 264 and on distillation gave 84% of distillable product with an amine number of 285. The NMR spectrographic examination of the distillate showed a content of 50% of primary coconut amine and 50% of N-methyl-coconut amine.

EXAMPLE V 12 liters of the tablets of Preparation A were placed in a hydrogenation apparatus with a 14 liter oven and heated up to 310° C. in a stream of hydrogen (250 atmospheres, 385 pressure liters per hour). After reaching this temperature, 1 liter of hydrogenated beef tallow (acid value 5.5, saponification value 198), and 700 g. of commercial ammonia, preheated together to 310° C., were fed hourly into the oven and about 1.0 liter of reaction product was removed hourly from the pressure separator. The crude product, worked up as in Example I, had an amine number of 206 and on distillation 88% was distillable and had an amine number of 213. The NMR spectrographic examination of the distillate showed a content of 90% of primary tallow amine and 10% of secondary amines of different composition.

EXAMPLE VI

Example V was repeated except that instead of the ammonia, 700 g. of commercial methylamine (97%) were fed in per hour and about 1.2 liters of reaction product were removed hourly. The crude product, worked up as in Example I, had an amine number of 197 and on distillation 92% was distillable with an amine number of 203. The NMR spectrographic examination of the distillate showed 5% of primary tallow amine, 90% of N-methyl-tallow amine and 5% of N,N-dimethyl-tallow amine.

EXAMPLE VII

Example V was repeated except that, instead of ammonia, 700 g. of commercial dimethylamine (97%) were fed in per hour and about 1.2 liters of reaction product were removed hourly. The crude product, worked up according to Example I, had an amine number of 174 and on distillation 90% was distillable with an amine number of 175. The NMR spectrographic examination of the distillate showed 60% of N-methyl-tallow amine and 40% of N,N-dimethyl-tallow amines.

EXAMPLE VIII

Example V was repeated except that the quantity of hydrogenated beef tallow fed in per hour was mixed with 0.5 liter of methanol and about 1.2 liters of reaction product were removed per hour. The crude product, worked up according to Example I, had an amine number of 203 and on distillation 88% was distillable with an amine number of 209. The NMR spectrographic examination of the distillate showed 30% of primary tallow amines, 65% of N-methyl-tallow amines and 5% of N,N-dimethyl-tallow amines.

EXAMPLE IX 12 liters of the catalyst tablets of preparation B were placed in a hydrogenation apparatus with a 14 liter oven. Nitrogen under pressure of 50 atmospheres was first passed through the gas circulation section of the hydrogenation apparatus, while the oven was heated up to 280° C. By addition of small quantities of hydrogen to the nitrogen cycle, the zinc-chromium oxide fraction of the catalyst was reduced so slowly that no appreciable rise in temperature occurred. The reducing pretreatment of the catalyst was carried out for a period of about 50 hours. The circulating gas was then replaced by hydrogen and the oven heated up to 310° C. at a pressure of 250 atmospheres and a gas circulation speed of 385 pressure liters per hour. After reaching this temperature, 1 liter of unhardened beef tallow (acid value 19.9, saponification value 197, iodine value 49.6) and 600 g. of commercial ammonia, both preheated to 310° C., were fed hourly into the oven and about 1.0 liter of reaction product was removed hourly from the pressure separator. The crude product, worked up as in Example I, had an amine number of 200 and on distillation 89% was distillable with an amine number of 205. The NMR spectrographic examination of the distillate showed a content of 95% of primary tallow amines and 5% of secondary amines of different composition.

EXAMPLE X

Example IX was repeated except that instead of the ammonia, 600 g. of commercial methylamine (97%) were fed in per hour and about 1.2 liters of reaction product were removed hourly from the pressure separator. The cude product, worked up as in Example I, had an amine number of 204 and on distillation 92% was distillable with an amine number of 206 and an iodine value of 52. The NMR spectrographic examination of the distillate showed a content of 95% of N-methyl-tallow amines and 5% of N,N-dimethyl-tallow amines.

EXAMPLE XI

Example IX was repeated except that, instead of the ammonia, 700 g. of commercial dimethylamine (97%) were fed in per hour and about 1.2 liters of reaction product were removed hourly. The crude product, worked up as in Example I, had an amine number of 173 and on distillation 90% was distillable with an amine number of 176. The NMR spectrographic examination of the distillate showed a content of 60% of N-methyl-tallow amines and 40% of N,N-dimethyl-tallow amines.

EXAMPLE XII

Example IX was repeated except that the amount of unhardened beef tallow fed in hourly was mixed with 0.5 liter of methanol and about 1.2 liters of reaction product were removed hourly from the pressure separator. The crude product, worked up as in Example I, had an amine number of 206 and on distillation 93% was distillable with an amine number of 212. The NMR spectrographic examination of the distillate showed a content of 35% of primary tallow amines and 65% of N-methyl-tallow amines.

Various modifications of the process of the invention may be made without departing from the spirit or scope thereof.

I claim:

1. A process for the preparation of aliphatic amines of the formula

wherein R is selected from the group consisting of saturated and unsaturated aliphatic radicals of 6 to 22 carbon atoms and $R_1$ and $R_2$ are selected from the group consisting of hydrogen and alkyl of 1 to 4 carbon atoms which comprises reacting a fatty acid glyceride having an R radical with a nitrogen compound of the formula

wherein $R_1$ and $R_2$ have the above definitions at 200 to 400° C. and a hydrogen pressure of 50 to 400 atmospheres in the presence of a metal oxide catalyst in lump form selected from the group consisting of zinc oxide-aluminum oxide and zinc oxide-chromium oxide catalysts.

2. The process of claim 1 wherein the temperature is 200 to 350° C.

3. The process of claim 1 wherein the hydrogen pressure is 100 to 300 atmospheres.

4. The process of claim 1 wherein a portion of the hydrogen is replaced by a reaction-inert gas.

5. The process of claim 1 wherein the amount of hydrogen is 50 to 500 times in excess of theory.

6. The process of claim 1 wherein the catalyst is zinc aluminum oxide.

7. The process of claim 1 wherein the catalyst is zinc-chromium oxide.

8. The process of claim 1 wherein the weight ratio of glyceride to nitrogen compound is 1:0.1 to 1:1.

9. The process of claim 8 wherein the weight ratio is 1:0.3 to 1:0.8.

10. The process of claim 1 wherein the reactants are preheated to 50 to 350° C.

11. The process of claim 1 wherein the nitrogen compound is selected from the group consisting of ammonia, monomethylamine and dimethylamine.

References Cited

UNITED STATES PATENTS

| | | | |
|---|---|---|---|
| 2,166,971 | 7/1939 | Schmidt et al. | 260—583(L) |
| 2,187,745 | 1/1940 | Lazier | 260—583(L)X |
| 2,456,315 | 12/1948 | Prichard | 260—583(L)X |

CHARLES B. PARKER, Primary Examiner

R. L. RAYMOND, Assistant Examiner

U.S. Cl. X.R.

260—585